(12) United States Patent
Dayan et al.

(10) Patent No.: US 9,436,666 B1
(45) Date of Patent: *Sep. 6, 2016

(54) SHARING GEOGRAPHICAL INFORMATION BETWEEN USERS

(71) Applicant: GOOGLE INC., Mountain View, CA (US)

(72) Inventors: Tal Dayan, Los Gatos, CA (US); Max Ross, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/795,267

(22) Filed: Jul. 9, 2015

Related U.S. Application Data

(63) Continuation of application No. 13/350,224, filed on Jan. 13, 2012, now Pat. No. 9,099,014, which is a continuation of application No. 11/454,243, filed on Jun. 17, 2006, now Pat. No. 8,122,341.

(51) Int. Cl.

| | |
|---|---|
| G06F 17/22 | (2006.01) |
| G06F 17/24 | (2006.01) |
| G06F 17/30 | (2006.01) |
| H04L 29/12 | (2006.01) |
| G09B 29/00 | (2006.01) |
| G01C 21/32 | (2006.01) |

(Continued)

(52) U.S. Cl.
CPC ............ *G06F 17/241* (2013.01); *G01C 21/32* (2013.01); *G06F 17/30061* (2013.01); *G06Q 10/101* (2013.01); *G09B 29/003* (2013.01); *H04H 60/78* (2013.01); *H04L 61/609* (2013.01)

(58) Field of Classification Search
CPC . G01C 21/32; G06F 3/0481; G06F 3/04812; G06F 17/241; G06F 17/30061; G06Q 10/101; G09B 29/003; H04L 12/18; H04L 61/609; H04H 60/78
See application file for complete search history.

(56) References Cited

U.S. PATENT DOCUMENTS

| | | | |
|---|---|---|---|
| 5,802,492 | A | 9/1998 | DeLorme et al. |
| 5,920,694 | A | 7/1999 | Carleton et al. |
| 5,987,380 | A | 11/1999 | Backman |

(Continued)

FOREIGN PATENT DOCUMENTS

| | | |
|---|---|---|
| EP | 1072987 | 1/2001 |
| WO | 01/01370 | 1/2001 |
| WO | 02/065331 | 8/2002 |

OTHER PUBLICATIONS

E. Bemieretal., "UMapiT: A-n On-Demand Web Mapping Tool Based on a Multiple Representation Database", 8th ICA Workshop on Generalisation, Jul. 7-8, 2005, pp. 1-9.

(Continued)

*Primary Examiner* — Maikhanh Nguyen
(74) *Attorney, Agent, or Firm* — Fish & Richardson P.C.

(57) ABSTRACT

Users can collaborate to annotate a map by sharing geographical information. Map data can be stored locally or remotely while annotations are stored in an annotation server. A presentation device such as a personal computer can use the map data to display a map and can access the annotations on the annotation server and display them. Different users can edit the annotations and save them on the annotation server. The annotations presented to users who are simultaneously viewing them can be synchronized. Presentation devices can download modules for sharing geographical information from servers such as web servers.

23 Claims, 6 Drawing Sheets

(51) Int. Cl.
*H04H 60/78* (2008.01)
*G06Q 10/10* (2012.01)

(56) References Cited

U.S. PATENT DOCUMENTS

| | | |
|---|---|---|
| 6,182,010 B1 | 1/2001 | Berstis |
| 6,199,014 B1 | 3/2001 | Walker et al. |
| 6,307,573 B1 | 10/2001 | Barros |
| 6,314,370 B1 | 11/2001 | Curtright |
| 6,321,158 B1 | 11/2001 | DeLorme et al. |
| 6,493,630 B2 | 12/2002 | Ruiz et al. |
| 6,526,284 B1 | 2/2003 | Sharp et al. |
| 6,577,714 B1 | 6/2003 | Darcie et al. |
| 6,606,542 B2 | 8/2003 | Hauwiller et al. |
| 6,650,998 B1 | 11/2003 | Rutledge et al. |
| 6,724,382 B2 | 4/2004 | Kenyon et al. |
| 6,810,323 B1 | 10/2004 | Bullock |
| 6,983,204 B2 | 1/2006 | Knutson |
| 7,089,110 B2 | 8/2006 | Pechatnikov et al. |
| 7,107,285 B2 | 9/2006 | von Kaenel et al. |
| 7,142,205 B2 | 11/2006 | Chithambaram et al. |
| 7,158,878 B2 | 1/2007 | Rasmussen et al. |
| 7,161,604 B2 | 1/2007 | Higgins et al. |
| 7,319,387 B2 | 1/2008 | Willson et al. |
| 7,373,244 B2 | 5/2008 | Kreft |
| 7,373,246 B2 | 5/2008 | O'Clair |
| 7,483,025 B2 | 1/2009 | Roy et al. |
| 7,509,215 B2 | 3/2009 | Shen et al. |
| 7,616,217 B2 | 11/2009 | Dayan et al. |
| 7,640,104 B2 | 12/2009 | Ramaswamy et al. |
| 7,669,117 B2 | 2/2010 | Albomoz et al. |
| 7,840,558 B2 | 11/2010 | Wiseman et al. |
| 8,122,341 B1 | 2/2012 | Dayan et al. |
| 8,139,514 B2 | 3/2012 | Weber et al. |
| 8,200,676 B2 | 6/2012 | Frank |
| 2001/0026271 A1 | 10/2001 | Higgins et al. |
| 2001/0045949 A1 | 11/2001 | Chithambaram et al. |
| 2002/0042819 A1 | 4/2002 | Reichert et al. |
| 2002/0112237 A1 | 8/2002 | Kelts |
| 2002/0163547 A1 | 11/2002 | Abramson et al. |
| 2002/0194197 A1 | 12/2002 | Flank |
| 2003/0041159 A1 | 2/2003 | Tinsley et al. |
| 2003/0182052 A1 | 9/2003 | DeLorme et al. |
| 2004/0125148 A1 | 7/2004 | Pea et al. |
| 2004/0172192 A1 | 9/2004 | Knutson |
| 2004/0209600 A1 | 10/2004 | Werner et al. |
| 2005/0064858 A1 | 3/2005 | Makela et al. |
| 2005/0073532 A1 | 4/2005 | Scott et al. |
| 2005/0144305 A1 | 6/2005 | Fegan et al. |
| 2005/0206562 A1 | 9/2005 | Willson et al. |
| 2005/0262081 A1 | 11/2005 | Newman |
| 2005/0278371 A1 | 12/2005 | Funk et al. |
| 2006/0241860 A1 | 10/2006 | Kimchi et al. |
| 2006/0271280 A1 | 11/2006 | O'Clair |
| 2007/0011150 A1 | 1/2007 | Frank |
| 2007/0203643 A1 | 8/2007 | Ramaswamy et al. |

OTHER PUBLICATIONS

Egenhofer, M., "Spatial Information Appliances: A Next Generation of Geographic Information Systems," 1st Brazilian Workshop on GeoInformatics, 1999, 4 pages.

GlobeXplorer, "ImageBuilder Dynamic Server with Overlays Application Programmer's Interface (API) Documentation V4.4.1," 2006, pp. 1-82.

Toyama, K. et al., "Geographic location tags on digital images," Proceedings of the eleventh ACM international conference on Multimedia, 2003, pp. 156-166.

Zafer et al., "NetEdit: A Collaborative Editor," Thesis submitted to the Faculty of Virginia Polytechnic Institute and State University, Apr. 23, 2001.

SHARING GEOGRAPHICAL INFORMATION BETWEEN USERS

CROSS REFERENCE TO RELATED APPLICATIONS

This application is a continuation application of, and claims priority to, ending U.S. patent application Ser. No. 13/350,224, filed Jan. 13, 2012, entitled "Sharing Geographical Information Between Users", which is a continuation of, and claims priority to, U.S. patent application Ser. No. 11/454,243, filed Jun. 17, 2006, entitled "Sharing Geographical Information Between Users," and issued as U.S. Pat. No. 8,122,341 on Feb. 21, 2012. The disclosure of the foregoing applications is incorporated herein by reference.

TECHNICAL FIELD

Embodiments relate to the fields of geographic data and digital cartography. Embodiments also relate to the fields of information sharing and electronic collaboration.

BACKGROUND

Digital cartography, or mapping, is becoming increasingly popular as applications for it become less expensive. Publishers like digital cartography because maps can be displayed with the publisher's services and location highlighted. Travelers like it because they can obtain a customized map with a travel route from an origination to a destination. In general, geographic data, which is the basis for digital mapping is becoming more available.

As it becomes more available, people discover more ways to use it.

Publishers have long used maps to direct customers to merchants. The maps are often printed on paper with annotations. An annotation is information that goes with a map. For example, a written street address or telephone number can help guide people to a merchant. An "X" or other icon can be printed on the map to graphically indicate a location. Digital maps can also have annotations. A person selects a map and annotates it. Another person can then view the annotated map. Travelers can also use an annotated map. A traveler's map can have annotations indicating waypoints, routes, and roadside services.

In the digital realm, annotated maps can be produced by anyone having access to geographic data. The specific map is usually application specific. As discussed above, a traveler's map differs from a publisher's map. Both types of maps, however, are produced and then published. They are commonly produced by a mapping tool or graphics application. They are often published by being printed, displayed on a computer screen, or presented on a cell phone screen.

BRIEF SUMMARY

The following summary is provided to facilitate an understanding of some of the innovative features unique to the embodiments and is not intended to be a full description. A full appreciation of the various aspects of the embodiments can be gained by taking the entire specification, claims, drawings, and abstract as a whole.

Systems and methods that allow collaborative map production and publication can be realized by sharing geographic information between users.

It is therefore an aspect of the embodiments to provide a map module that can access map data and use the map data to display a map on a presentation device. The map data can be geographical data indicating roads, routes, or terrain. The geographic data can include an image of an area such as a satellite photo of a portion of the earth's surface. The map data can be stored locally within a device, such as a hard drive or memory chip, associated with the presentation device. The map data can alternatively be stored remotely in a map server that the presentation device can access. A web server can be used as a map server.

A map control can be used to pan, zoom, or otherwise adjust a map. Panning is a way of moving around on the map to see other parts. A person can zoom in to view fine details or zoom out to see the big picture. Other controls can be used bring out other details such as to view a road map overlying a satellite image or to view topographic details.

It is also an aspect of the embodiments to provide an annotation editing module. The annotation editing module can be used to create annotations or to edit annotations. An annotation is information that can be displayed in association with the map. An annotation can be a note pertaining generally to the map or can be registered to a map location. An annotation is registered to a map location when it must be displayed in a specific place relative to the mapped geography. For example, an "X" on a treasure map showing a treasure location is registered to the treasure location. The treasure map is less than helpful if the "X" is not registered to a map location and is thereby displayed at the wrong place. Map coordinates, such as the location's latitude and longitude, can be used to register annotations to map locations.

It is another aspect of the embodiments to provide an annotation viewing module. The presentation device can use the annotation viewing module to show the annotations around, overlying, or underlying the map. Annotations can overlie the map so that they are visible on top of the map versus being obscured by the map.

It is yet another aspect of the embodiments to associate a locator with the annotations. A locator can be used to access one or more annotations. For example, a person can create annotations indicating the locations of various friends' homes on a map. The person can then associate the locator "Buds" with the annotations. As such. "Buds" can be used to access the annotations, and thereby the map that is annotated. Alternatively, the person can store the annotated map at which time an automatically generated locator can be associated with the annotations. A locator can be associated with more than one annotation. Similarly, an annotation can be associated with more than one locator.

A uniform resource locator (URL) such as those commonly used for accessing web pages and data on the Internet is a locator. A person can create annotations, store them on a web server, and then publish one or more URLs. People can then use the URLs to access the annotations.

It is still yet another aspect of the embodiments to provide an annotation storage module that stores the annotations. As discussed above, locators can be used to access the annotations. A simple embodiment can store annotations in a file and use the locator as a file name. A more complicated embodiment can use a relational database to associate locators with annotations and to use the locators for accessing the annotations. A web server can act as an annotation server if the web server contains an annotation storage module or can otherwise access an annotation storage module. For example, a web server can remotely access annotations held in a relational database that is in a distant data center.

It is a further aspect of the embodiments to provide a communication network that users can use to access the annotations. The communications network can also be used to access remotely stored map data. One person can create an annotated map and tell another person what locator to use. The other person can then access the annotations and even use the annotation editing module to edit them.

An authentication server can be used to restrict access to the annotations. Access can be restricted based on passwords or membership in a group. Types of access can also be restricted. People who can view the annotations have viewing access. People who have editing access can edit the annotations. As such a group of people having editing access can collaborate to annotate a map.

A group of people can collaborate by simultaneously editing annotations. When one person changes an annotation, the other people can see the change. For example, an annotation editing module can store the change on the annotation server which is then sent, or pushed, to each person's annotation viewing module. Alternatively, each person's annotation viewing module can regularly contact the annotation server and download the changed annotations.

Access to the annotations can be logged. A log can show who accessed what annotation, when they accessed it, and what they did with it. For example, the log could show "Bob viewed Buds on Dec. 31, 2006 at 11:55 PM" and that "Dan edited Buds on Dec. 31, 2006 at 11:57 PM." Furthermore, a log can show what was done, such as what Dan did to the annotations associated with Buds.

A module server can be used to download modules such as the map module, the annotation editing module, the annotation viewing module, or the annotation storage module into a presentation device. For example, a module can be a java applet or javascript script stored on a web server. A person can use a web browser running on a computer to access the web server and download a module. The module can then be executed in the browser. Alternatively, a person can download a module that is an executable program from a server and then run it.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the background of the invention, brief summary of the invention, and detailed description of the invention, serve to explain the principles of the present invention.

DETAILED DESCRIPTION

The particular values and configurations discussed in these non-limiting examples can be varied and are cited merely to illustrate embodiments and are not intended to limit the scope of the invention.

Overview

Users can collaborate to annotate a map by sharing geographical information. Map data can be stored locally or remotely while annotations are stored in an annotation server. A presentation device such as a personal computer can use the map data to display a map and can access the annotations held on the annotation server and display them. Different users can edit the annotations and save them on the annotation server. The annotations presented to users who are simultaneously viewing them can be synchronized such that each user sees the same annotation. Presentation devices can download modules for sharing geographical information from servers such as web servers.

Architectural Overview

Figure 1:
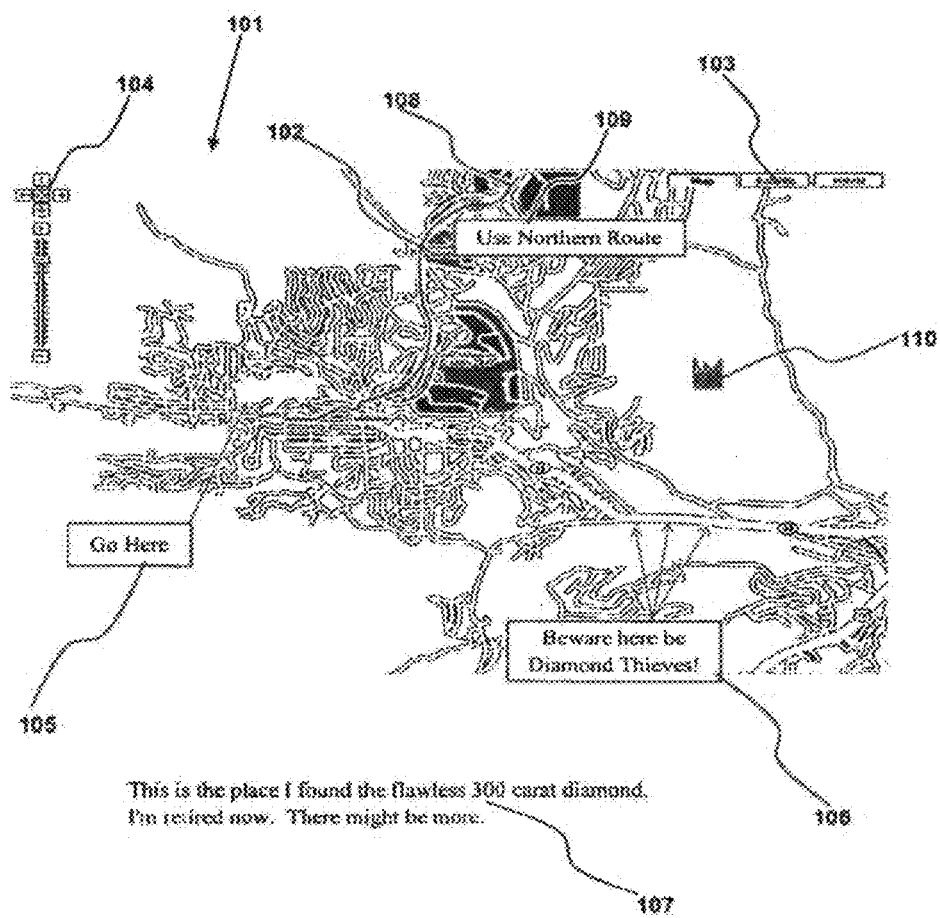
FIG. 1 illustrates an annotated map in accordance with aspects of the embodiments.

FIG. 1 illustrates an annotated map in accordance with aspects of the embodiments.

A map 101 of Ruidoso, N. Mex. is presented. It has a pan and zoom control 104 and a presentation control 103. The presentation control 103 can be used to select between different views of the map 101. The view presented shows Ruidoso's roads. The satellite view is a satellite image of Ruidoso while the hybrid view has the road view overlying the satellite view.

The map 101 has labels identifying streets and parks such as the park label 102. Labels are distinguished from annotations here because users can not edit and collaborate on the labels. The labels are part of the map.

The "Go Here" 105 annotation is shown overlying the map 101 with an indication of where to go. The "Go Here" annotation is registered to the map 101 so that the desired location does not change on the map regardless of any panning or zooming. A second annotation 106 is registered to three map locations.

A third annotation 108 indicates a road. The third annotation 108 is a curve that follows the course of the road. A freehand pen tool or a polyline drawing tool can be used to create curves such as the third annotation 108. A fourth annotation 109 overlies the map 101 but does not need to be registered to a map location. A fifth annotation 107 appears below the map and is a general note.

The fire danger indicator 110 is a live annotation. A live annotation conveys changing information. The fire danger indicator 110 is an example of a live annotation that presents the level of fire danger in the area. Moving a mouse pointer over the fire danger indicator 110 can cause a text message explaining the fire danger indicator's meaning to be displayed. For example, mousing over the fire danger indicator 110 can cause the text "Fire Danger: Extreme" to be displayed. The actual data can be obtained from a live data source such as a Forest Service web site. As such, a user can place the fire danger indicator 110 on the map and the fire danger indicator will automatically change as the Forest Service changes the danger level. Other examples are wind speed and direction indicators that can be associated with wind monitoring equipment. The map can then present dynamically changing wind conditions. A live annotation can poll the data source at regular intervals or can receive data that the data source broadcasts.

Figure 2:
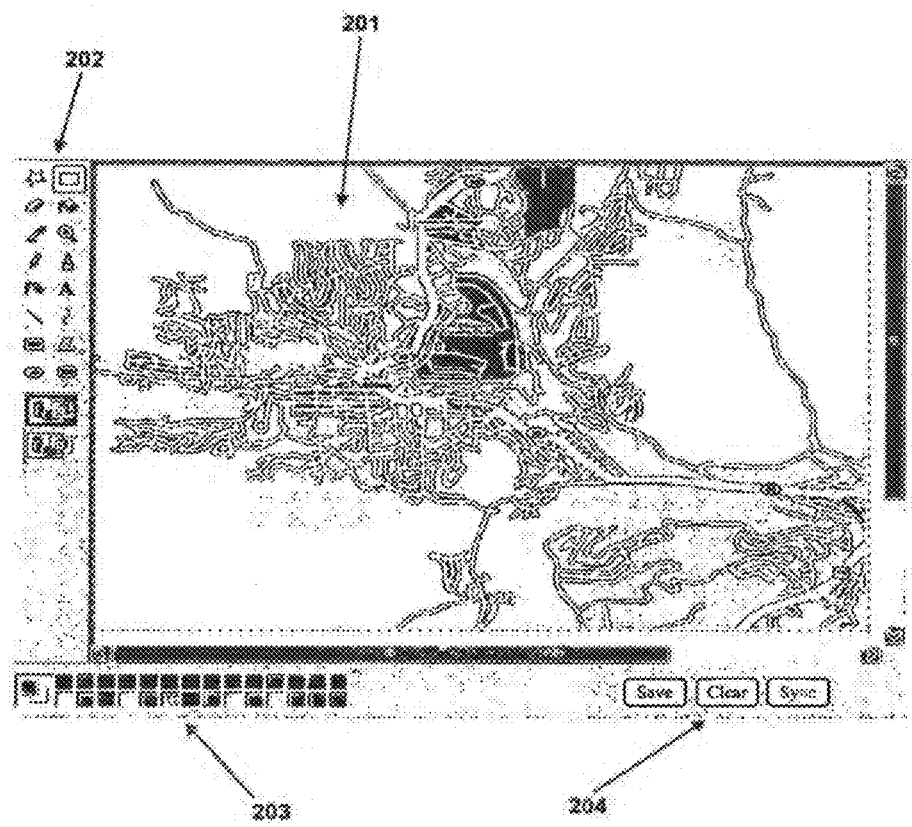
FIG. 2 illustrates an annotation editor in accordance with aspects of the embodiments.

FIG. 2 illustrates an annotation editor in accordance with aspects of the embodiments. A map 201 is presented in the editor. Standard drawing tools are presented in a tool palette 202. Those familiar with drawing or drafting on a computer are familiar with the tools presented as well as with many other tools. A color palette 203 can be used for selecting colors. Buttons 204 can be used to save annotations to the annotation server, to clear unsaved annotations, or to synchronize the annotations with those on the annotation server.

Figure 3:
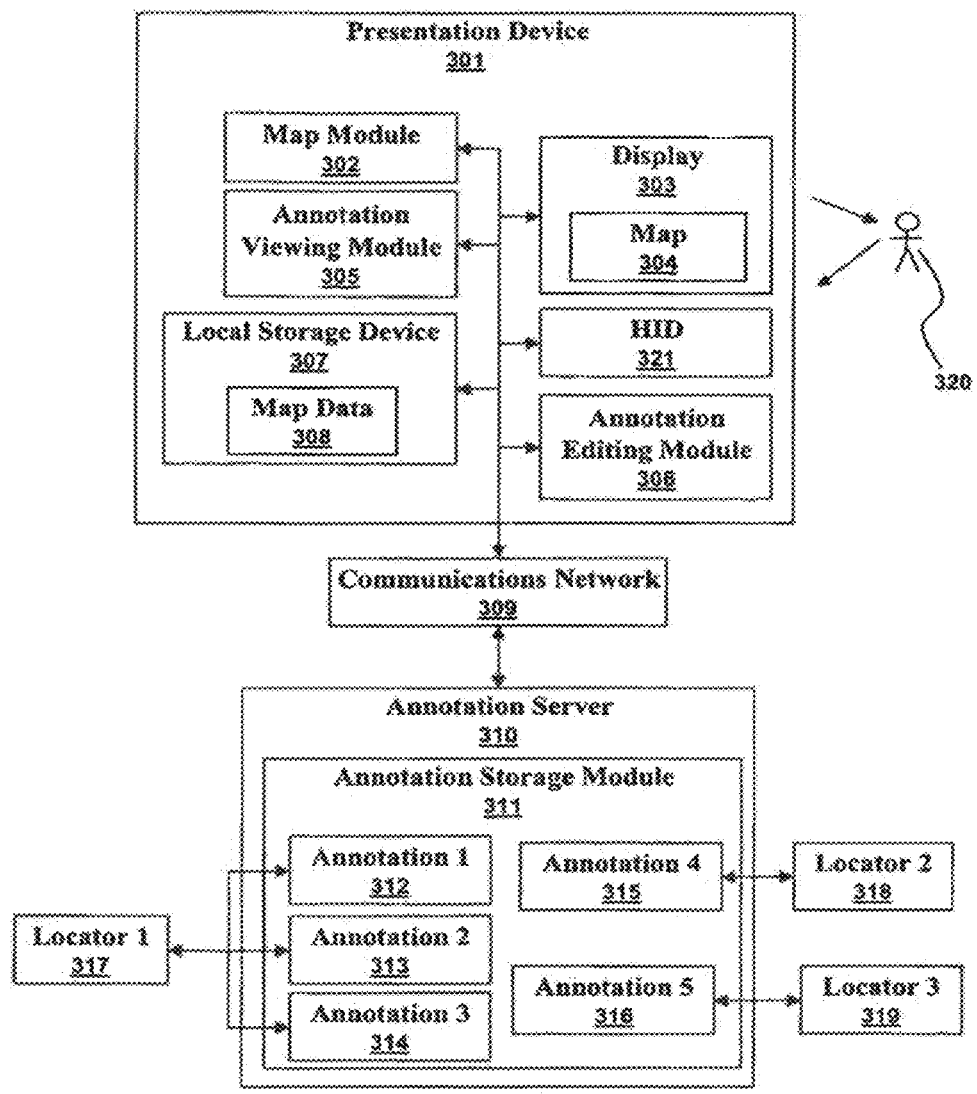
FIG. 3 illustrates a high level block diagram of a system for sharing geographical information between users in accordance with aspects of the embodiments.

FIG. 3 illustrates a high level block diagram of a system for sharing geographical information between users in accordance with aspects of certain embodiments. A user 320 uses a presentation device 301 by viewing its display 303 and manipulating its human interface device (HID) 321. The presentation device also has a map module 302 annotation module 305 a local storage device 307 and an annotation editing module 306. The map module 302 uses map data 308 obtained from the local storage device 307 to present a map 304 on the display 303. If the map 304 is interactive, meaning it has a map control, the user 320 can use the HID 321 to control the map 304.

The annotation viewing module 305 can use the communications network 309 to contact the annotation server 310 to obtain annotations. The annotations can be displayed with the map 304 on the display device 303. The annotation editing module 306 can store annotations on the annotation server 310.

The annotation server is shown having an annotation storage module 311 containing annotation 1 312, annotation 2 313, annotation 3 314, annotation 4 315, and annotation 5 316. Locator 1 317 is associated with annotation 1 312, annotation 2 313, and annotation 3 314. Locator 2 318 is associated with annotation 4 315 and Locator 3 is associated with annotation 5 316. The locators can be used to access the annotations.

Figure 4:
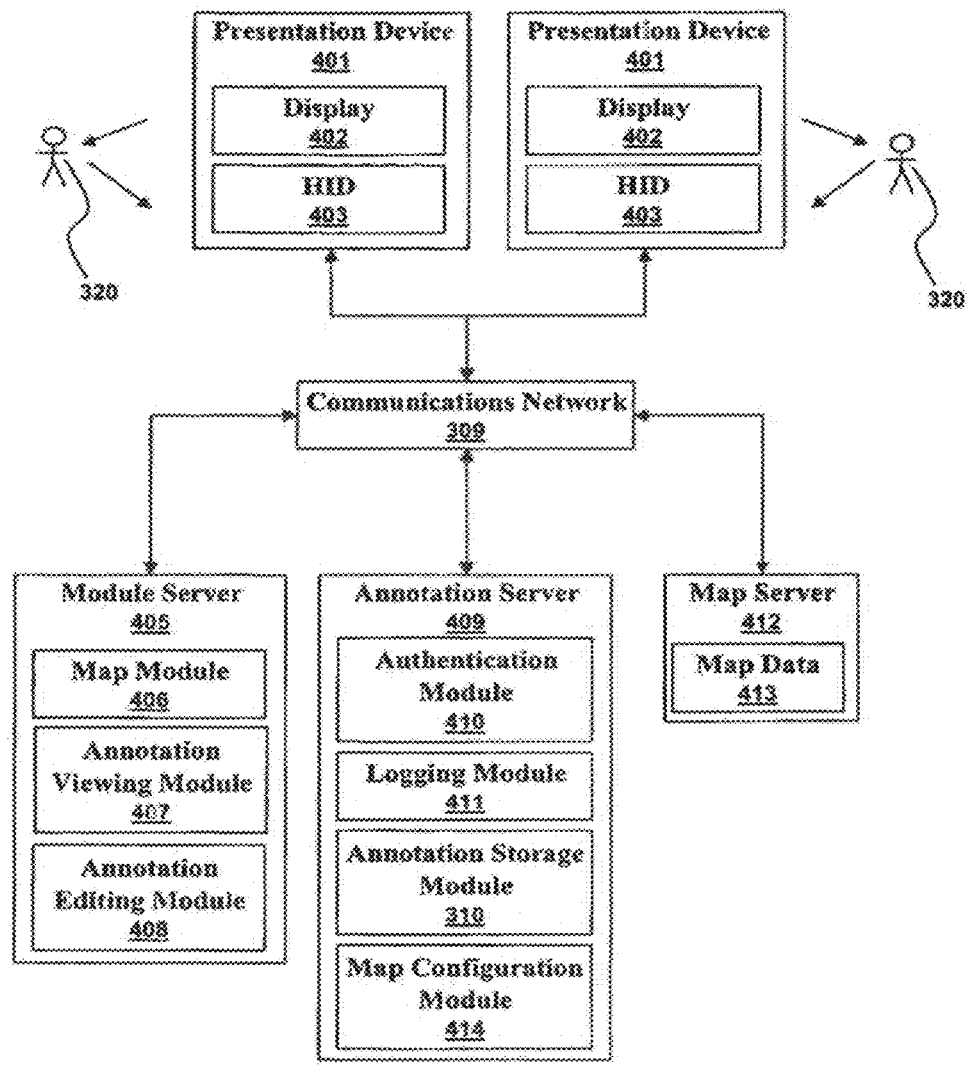
FIG. 4 illustrates a high level block diagram of another system for sharing geographical information between users in accordance with aspects of the embodiments.

FIG. 4 illustrates a high level block diagram of another system for sharing geographical information between users in accordance with aspects of certain embodiments. The presentation devices 401 have HIDs 403 and displays 402. The users 320 can use the presentation devices 401 to access the module server 405 and download individual copies of the map module 406, annotation viewing module 407 and annotation editing module 408. The modules can be executed in the presentation devices 401. For example, the presentation devices 401 can be personal computers and the users 320 can use web browsers to obtain and run the modules.

The map module 405, once running in a presentation device 401, can access the map data in the map server 412. The map module 405 can then use the map data 413 to display a map to a user 320. Similarly, the annotation viewing module 407 can access the annotations in the annotation server 412 and present them to a user 320.

The annotation editing module, once running in a presentation device 401, can be used to create, edit, and delete annotations. The annotations can then be stored to, or deleted from, the annotation storage module 310 in the annotation server 409. The logging module 411 logs the annotation creations, edits, and deletions. The authentication module 410 restricts access to the annotations.

After an author annotates a map, the annotations can be stored so that other users can access them. The other users, however, often need some viewing parameters as guidance for displaying the mapped location. A mapped location can be specified by a center point and a scale. For example, the center can be Ruidoso, N. Mex. and the scale can be selected so that the map shows a 50 square mile area around the center. The viewing parameters can also include orientation or enable/disable various layers of information such as roads, topological height lines, school locations, and other information. The viewing parameters can be embedded in the annotations, in a uniform resource locator (URL), or obtained from a map configuration module 414.

A URL can be used to access viewing parameters. A user can enter the URL into a web browser. The viewing parameters can also contain the annotations. The annotations can be directly contained in the viewing parameters in which case the annotation server and the viewing parameter server are essentially the same server. The viewing parameters can indirectly contain the annotations by using locators, such as URLs, that can be used to access the annotations.

For example, an author creates annotations, stores them, and obtains a uniform resource locator (URL) that can be used to view the annotated map. The author can publish the URL so that other people can enter the URL into a web browser and view the author's annotated map. The URL can contain information describing the viewing parameters. Alternatively, the URL can contain information that can be used to obtain viewing parameters from a map configuration module 414. The map configuration module is illustrated as within the annotation server although it could just as easily be within the map server, a dedicated server, or elsewhere within the system.

Figure 6:
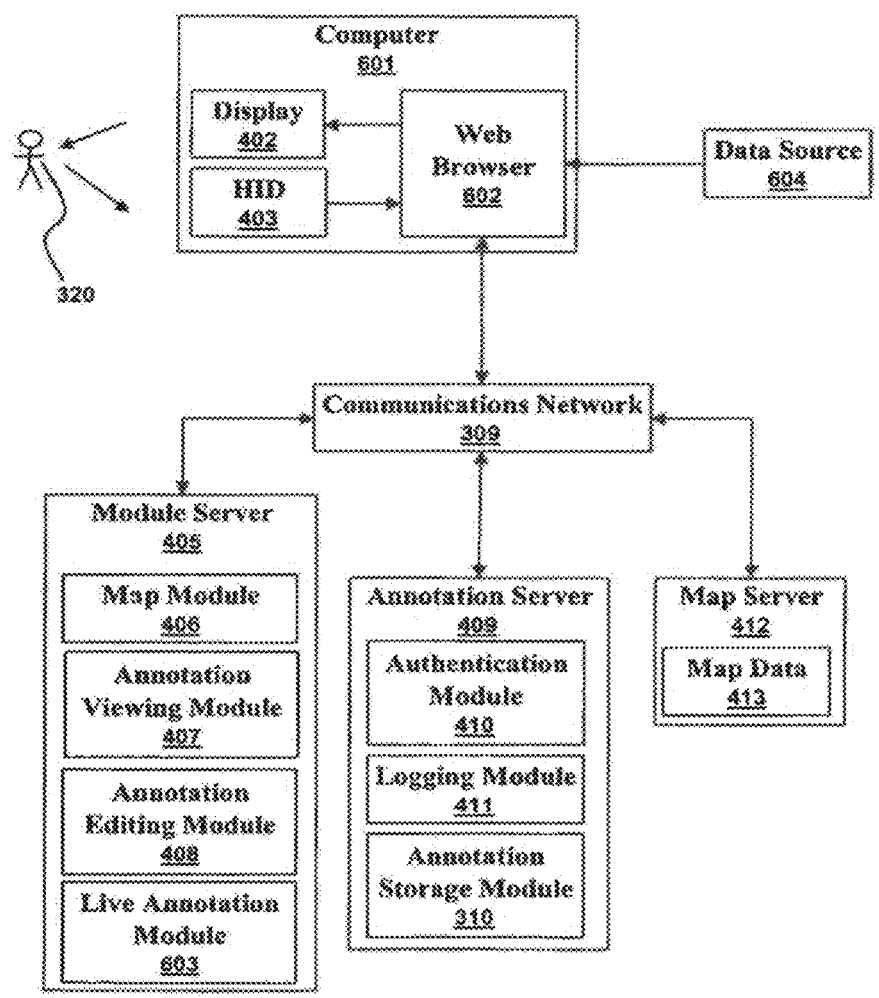
FIG. 6 illustrates a high level block diagram of a system for sharing geographical information between users with web browsers in accordance with aspects of the embodiments.

FIG. 6 illustrates a high level block diagram of a system for sharing geographical information between users with web browsers in accordance with aspects of the embodiments. FIG. 6 illustrates a special case of the system of FIG. 3. In FIG. 6, the presentation device is a computer 601 running a web browser 602. The web browser 602 can obtain the modules from the module server 405 and run them. Alternatively, the web browser can access a server, such as the annotation server or map server, which then runs the module and sends information to the web browser. A server side script is an example of a module that a server runs in response to a web browser request for obtaining data that is returned in the servers' response. In general, a module can be run on either a server or a on a client. The web browser 602 can access annotations on the annotation server 409 and map data on the map server 412.

FIG. 6 also illustrates a live annotation module 603 that the web browser 602 can obtain from the module server 405. The web browser can display the live annotation and update the appearance of the live annotation based on data obtained from a data source 604. The annotation server or any other server can be used to serve the live annotation module, the choice of server is an implementation detail.

High Level Process Flow

Figure 5:
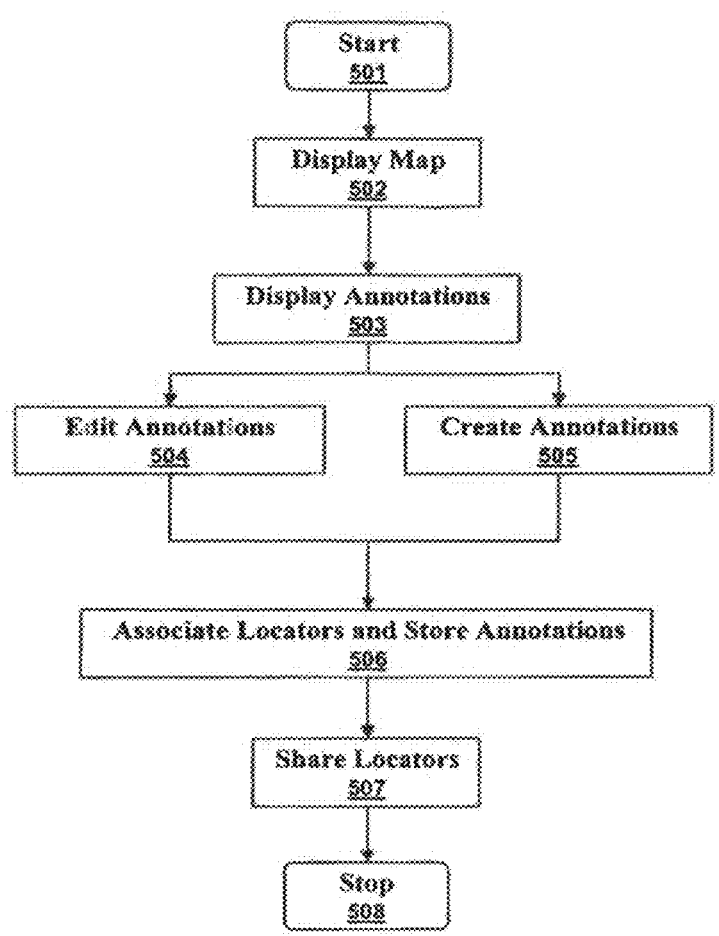
FIG. 5 illustrates a high level flow diagram of sharing geographical information between users in accordance with aspects of the embodiments.

FIG. 5 illustrates a high level flow diagram of sharing geographical information between users in accordance with aspects of certain embodiments. After the start 501 the map is displayed 502 and the annotations are displayed 503. A user can then create new annotations 505 or edit existing annotations 504. The annotations can then be associated with locators and stored 506 in an annotation storage module. A user can then share the locators 507 so that other users can collaborate on the annotations. The process can then stop 508.

General

Embodiments can be implemented in the context of modules. In the computer programming arts, a module (e.g., a software module) can be implemented as a collection of routines, data structures, firmware and hardware that perform particular tasks or implement a particular abstract data type. Modules generally can be composed of two parts. First, a software module may list the constants, data types, variable, routines and the like that that can be accessed by other modules or routines. Second, a software module can be configured as an implementation, which can be private (i.e., accessible perhaps only to the module), and that contains the source code that actually implements the routines or subroutines upon which the module is based. Thus, for example, the term "module", as utilized herein generally refers to software modules or implementations thereof. Such modules can be utilized separately or together to form a program product that can be implemented through signal-bearing media, including transmission media and recordable media.

The examples discussed above are intended to illustrate aspects of the embodiments. The phrases "an embodiment", "some embodiments", or "certain embodiments" do not necessarily refer to the same embodiment or any specific embodiment.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method comprising:
   providing, by a map server, map data of a geographical area for presentation to a first user on a first user device;
   receiving, by an annotation server from the first user device, a live annotation associated with a geographical location within the geographical area, wherein the live annotation comprises a description associated with the geographical location within the geographical area;
   obtaining, by the annotation server, an updated description for the live annotation;
   providing updated map data of the geographical area including providing by the annotation server, the updated description of the live annotation for presentation to the first user on the first user device;
   receiving, from a different second user associated with a second user device, a request for map data of a second geographical area that includes the geographical location associated with the live annotation received from the first user; and
   in response to the request, providing, to the second user device, map data of the second geographical area, including providing, by the annotation server, the live annotation received from the first user for presentation to the second user on the second user device.

2. The method of claim 1, wherein the first user device obtains the updated description for the live annotation from data broadcast by a live data source.

3. The method of claim 1, wherein the first user device requests the updated description for the live annotation from a live data source.

4. The method of claim 1, further comprising:
   receiving, from the second user, an edit to the live annotation;
   updating the live annotation according to the edit received from the second user; and
   providing the updated live annotation for presentation to one or more other users.

5. The method of claim 4, wherein receiving, from the second user, the edit to the live annotation comprises receiving the live annotation from the second user concurrently with the live annotation being displayed by the first user device.

6. The method of claim 5, further comprising pushing the edit to the live annotation received from the second user to the first user device for presentation to the first user.

7. The method of claim 4, wherein updating the live annotation according to the edit received from the second user comprises:
   determining that the second user is among a group of users having editing access for the live annotation.

8. The method of claim 4, wherein receiving, from the second user, the edit to the live annotation comprises receiving one or more viewing parameters associated with the live annotation.

9. The method of claim 8, wherein the viewing parameters comprise one or more of an orientation of the live annotation and a layer of information to display with the live annotation.

10. The method of claim 1, wherein receiving, from the different second user, the request for map data of the second geographical area comprises receiving, from the second user, a uniform resource locator corresponding to the live annotation received from the first user.

11. The method of claim 1, further comprising receiving, from the first user, a request to share the live annotation received from the first user with one or more other users including the second user.

12. A system comprising:
   one or more computers and one or more storage devices storing instructions that are operable, when executed by the one or more computers, to cause the one or more computers to perform operations comprising:
   providing, by a map server, map data of a geographical area for presentation to a first user on a first user device;
   receiving, by an annotation server, from the first user device, a live annotation associated with a geographical location within the geographical area, wherein the live annotation comprises a description associated with the geographical location within the geographical area;
   obtaining, by the annotation server, an updated description for the live annotation;
   providing updated map data of the geographical area including providing by the annotation server, the updated description of the live annotation for presentation to the first user on the first user device;
   receiving, from a different second user associated with a second user device, a request for map data of a second geographical area that includes the geographical location associated with the live annotation received from the first user; and
   in response to the request, providing, to the second user device, map data of the second geographical area, including providing, by the annotation server, the live annotation received from the first user for presentation to the second user on the second user device.

13. The system of claim 12, wherein the first user device obtains the updated description for the live annotation from data broadcast by a live data source.

14. The system of claim 12, wherein the first user device requests the updated description for the live annotation from a live data source.

15. The system of claim 12, wherein the operations further comprise:
    receiving, from the second user, an edit to the live annotation;
    updating the live annotation according to the edit received from the second user; and
    providing the updated live annotation for presentation to one or more other users.

16. The system of claim 15, wherein receiving, from the second user, the edit to the live annotation comprises receiving the live annotation from the second user concurrently with the live annotation being displayed by the first user device.

17. The system of claim 16, further comprising pushing the edit to the live annotation received from the second user to the first user device for presentation to the first user.

18. The system of claim 15, wherein updating the live annotation according to the edit received from the second user comprises:
    determining that the second user is among a group of users having editing access for the live annotation.

19. The system of claim 15, wherein receiving, from the second user, the edit to the live annotation comprises receiving one or more viewing parameters associated with the live annotation.

20. The system of claim 19, wherein the viewing parameters comprise one or more of an orientation of the live annotation and a layer of information to display with the live annotation.

21. The system of claim 12, wherein receiving, from the different second user, the request for map data of the second geographical area comprises receiving, from the second user, a uniform resource locator corresponding to the live annotation received from the first user.

22. The system of claim 12, further comprising receiving, from the first user, a request to share the live annotation received from the first user with one or more other users including the second user.

23. A computer program product, encoded on one or more non-transitory computer storage media, comprising instructions that when executed by one or more computers cause the one or more computers to perform operations comprising:
    providing, by a map server, map data of a geographical area for presentation to a first user on a first user device;
    receiving, by an annotation server from the first user device, a live annotation associated with a geographical location within the geographical area, wherein the live annotation comprises a description associated with the geographical location within the geographical area;
    obtaining, by the annotation server, an updated description for the live annotation;
    providing updated map data of the geographical area including providing by the annotation server, the updated description of the live annotation for presentation to the first user on the first user device;
    receiving, from a different second user associated with a second user device, a request for map data of a second geographical area that includes the geographical location associated with the live annotation received from the first user; and
    in response to the request, providing, to the second user device, map data of the second geographical area, including providing, by the annotation server, the live annotation received from the first user for presentation to the second user on the second user device.

\* \* \* \* \*